US010093750B2

(12) United States Patent
Dire et al.

(10) Patent No.: US 10,093,750 B2
(45) Date of Patent: *Oct. 9, 2018

(54) MODIFIED DIENE ELASTOMER COMPRISING A DIENE ELASTOMER COUPLED BY AN AMINOALKOXYSILANE COMPOUND AND HAVING AN AMINE FUNCTION AT THE CHAIN END, AND RUBBER COMPOSITION COMPRISING SAME

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Charlotte Dire, Clermont-Ferand (FR); Jean Marc Marechal, Clermont-Ferrand (FR); Nicolas Seeboth, Clermont-Ferrand (FR)

(73) Assignees: COMPAGNIE GENERALE DES ETABLISSEMENTS MICHELIN, Clermont-Ferrand (DE); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 85 days.

This patent is subject to a terminal disclaimer.

(21) Appl. No.: 14/910,662

(22) PCT Filed: Aug. 4, 2014

(86) PCT No.: PCT/EP2014/066674
§ 371 (c)(1),
(2) Date: Feb. 5, 2016

(87) PCT Pub. No.: WO2015/018772
PCT Pub. Date: Feb. 12, 2015

(65) Prior Publication Data
US 2016/0176992 A1  Jun. 23, 2016

(30) Foreign Application Priority Data
Aug. 9, 2013  (FR) ...................................... 13 57908

(51) Int. Cl.
| | |
|---|---|
| *C08C 19/25* | (2006.01) |
| *C08C 19/44* | (2006.01) |
| *B60C 1/00* | (2006.01) |
| *C08K 3/36* | (2006.01) |
| *C08F 236/10* | (2006.01) |

(52) U.S. Cl.
CPC ................ *C08C 19/25* (2013.01); *B60C 1/00* (2013.01); *B60C 1/0016* (2013.01); *C08C 19/44* (2013.01); *C08F 236/10* (2013.01); *C08K 3/36* (2013.01)

(58) Field of Classification Search
CPC ....................................... C08C 19/25
See application file for complete search history.

(56) References Cited

U.S. PATENT DOCUMENTS

| | | | |
|---|---|---|---|
| 8,071,689 B2 | 12/2011 | Halasa et al. | |
| 8,106,130 B2 | 1/2012 | Fukuoka et al. | |
| 2008/0319151 A1* | 12/2008 | Oshima | ................... C08C 19/44 528/14 |
| 2012/0245275 A1 | 9/2012 | Ito et al. | |
| 2012/0252966 A1* | 10/2012 | Ito | ........................... C08C 19/25 524/575 |

FOREIGN PATENT DOCUMENTS

| | | |
|---|---|---|
| EP | 2266819 A1 | 12/2010 |
| FR | 2867477 A1 | 9/2005 |
| JP | 2006257260 A | 9/2006 |
| WO | 9637547 A2 | 11/1996 |
| WO | 9736724 A2 | 10/1997 |
| WO | 9916600 A1 | 4/1999 |
| WO | 9928380 A1 | 6/1999 |
| WO | 0210269 A2 | 2/2002 |
| WO | 2006069792 A1 | 7/2006 |
| WO | 2006069793 A1 | 7/2006 |
| WO | 2008003434 A1 | 1/2008 |
| WO | 2008003435 A1 | 1/2008 |
| WO | 2009133068 A1 | 11/2009 |

OTHER PUBLICATIONS

Vilmin, F., Dussap, C. and Coste, N., Applied Spectroscopy, 2006, 60, 619-29: Fast and Robust Method for the Determination of Microstructure and Composition in Butadiene, Styrene-Butadiene, and Isoprene Rubber by Near-Infrared Spectroscopy.

* cited by examiner

*Primary Examiner* — Peter D Mulcahy
(74) *Attorney, Agent, or Firm* — Dickinson Wright PLLC

(57) ABSTRACT

The invention relates to a modified diene elastomer comprising predominantly the entity functionalized in the middle of the chain by an alkoxysilane group, optionally partially or completely hydrolyzed to give silanol, bearing a tertiary amine functional group and the silicon atom of which bonds the two pieces of the chain, the chain ends of the modified diene elastomer being functionalized to at least 70 mol %, with respect to the number of moles of chain end, by an amine functional group.

21 Claims, 1 Drawing Sheet

MODIFIED DIENE ELASTOMER COMPRISING A DIENE ELASTOMER COUPLED BY AN AMINOALKOXYSILANE COMPOUND AND HAVING AN AMINE FUNCTION AT THE CHAIN END, AND RUBBER COMPOSITION COMPRISING SAME

This application is a 371 national phase entry of PCT/EP2014/066674, filed 4 Aug. 2014, which claims benefit of French Patent Application No. 1357908, filed 9 Aug. 2013, the entire contents of which are incorporated herein by reference for all purposes.

BACKGROUND

1. Field

The invention relates to a modified diene elastomer comprising predominantly the diene elastomer functionalized in the middle of the chain by an alkoxysilane group, optionally hydrolysed, bearing a tertiary amine functional group and functionalized at the chain end by an amine group. The invention also relates to a process for the preparation of such a modified diene elastomer, to a composition comprising it, and to a semi-finished article and a tire comprising this composition.

2. Description of Related Art

Now that savings in fuel and the need to protect the environment have become a priority, it is desirable to produce mixtures having good mechanical properties, in particular good stiffness and a hysteresis which is as low as possible in order to be able to process them in the form of rubber compositions which can be used in the manufacture of various semi-finished products participating in the composition of tire casings, such as, for example, underlayers, sidewalls or treads, and in order to obtain tires having a reduced rolling resistance.

The reduction in the hysteresis of the mixtures is an ongoing objective which has, however, to be done while retaining the suitability for processing, in particular in the raw state, of the mixtures.

Many solutions have already been experimented with in order to achieve the objective of fall in hysteresis. Mention may in particular be made of the modification of the structure of diene polymers and copolymers for the purpose of polymerization by means of functionalization agents or else the use of functional initiators, the aim being to obtain a good interaction between the polymer, thus modified, and the filler, whether carbon black or a reinforcing inorganic filler.

Mention may be made, by way of illustration of this prior art, of the use of diene elastomers functionalized by alkoxysilane compounds bearing an amine functional group.

Mention may be made of Patent FR 2 867 477 A1, which claims the functionalization at the chain end with compounds of (dialkylaminoalkyl)trialkoxysilane, and also a rubber composition based on silica or carbon black. Mention may also be made of U.S. Pat. No. 8,071,689 B2 and U.S. Pat. No. 8,106,130 B2, which respectively claim, for one, the functionalization at the chain end with the trialkoxysilane compound bearing a nitrogen-based group, the nitrogen atom being included in a substituted or unsubstituted aromatic heterocycle, and, for the other, with an alkoxysilane bearing an amine functional group having at least one alkoxysilyl group and at least two tertiary amine groups. Finally, mention may be made of Patent Application WO2009133068A1, which indicates that the functionalization in the middle of the chain with an alkoxysilane compound bearing a secondary or tertiary amine functional group makes it possible to improve the raw processing/hysteresis compromise in comparison with a functionalization at the chain end.

Provision is made, in Patent JP4655706B2, to combine the functionalization of the living chain end with a compound of the alkoxysilane type bearing an amine functional group with the initiating with an amine-functional alkyl-lithium with the aim of minimizing the hysteresis. In the same way, provision is made, in Patent Application US20120245275A1, to combine the functionalization of the living chain end with a compound of the alkoxysilane type bearing an amine functional group with the initiating with a lithium amide but also with the copolymerization with a functional monomer of the vinylaminosilane type.

These functionalized elastomers have been described in the prior art as effective in reducing hysteresis. Nevertheless, it turns out that the compositions comprising elastomers thus modified do not always exhibit a satisfactory hysteresis, an acceptable processing and mechanical properties satisfactory for use as tire tread.

For this reason, research studies have been carried out on other functionalization reactions for the purpose of obtaining rubber compositions having an improved raw processing/hysteresis/stiffness compromise.

SUMMARY

The aim of the present invention is thus to provide such a composition. One objective is in particular to provide a functionalized elastomer which interacts satisfactorily with the reinforcing filler of a rubber composition containing it in order to minimize the hysteresis thereof, while retaining an acceptable raw processing and a satisfactory stiffness, for the purpose in particular of use in a tire tread.

This aim is achieved in that the inventors have just discovered, surprisingly, during their research studies, that a diene elastomer modified by coupling by means of an agent bearing at least one tertiary amine functional group and an alkoxysilane functional group, which can or cannot be hydrolysed to give a silanol, and the two chain ends of which are functionalized to at least 70 mol % by an amine functional group, confers, on the compositions comprising it, a noteworthy and unexpected improvement in the hysteresis/stiffness/raw processing compromise.

This is because, on the one hand, the hysteresis/stiffness compromise of such compositions is improved with respect to that of compositions comprising elastomers not having an amine functional group at the chain end, in particular with respect to that of compositions comprising diene elastomers modified by coupling by means of an agent bearing at least one tertiary amine functional group and an alkoxysilane functional group but not having an amine functional group at the chain end. Moreover, the raw processing of such compositions is similar to that of compositions comprising non-functionalized elastomers and remains acceptable.

A subject-matter of the invention is thus a modified diene elastomer comprising predominantly the entity functionalized in the middle of the chain by an alkoxysilane group, optionally partially or completely hydrolysed to give silanol, bearing a tertiary amine functional group and the silicon atom of which bonds the two pieces of the chain, the chain ends of the modified diene elastomer being functionalized to at least 70 mol %, with respect to the number of moles of chain end, by an amine functional group.

Another subject-matter of the invention is a process for the synthesis of said modified diene elastomer.

Another subject-matter of the invention is a reinforced rubber composition based on at least one reinforcing filler and on an elastomer matrix comprising at least said modified diene elastomer.

DETAILED DESCRIPTION OF THE SPECIFIC EMBODIMENTS

Figure 1:
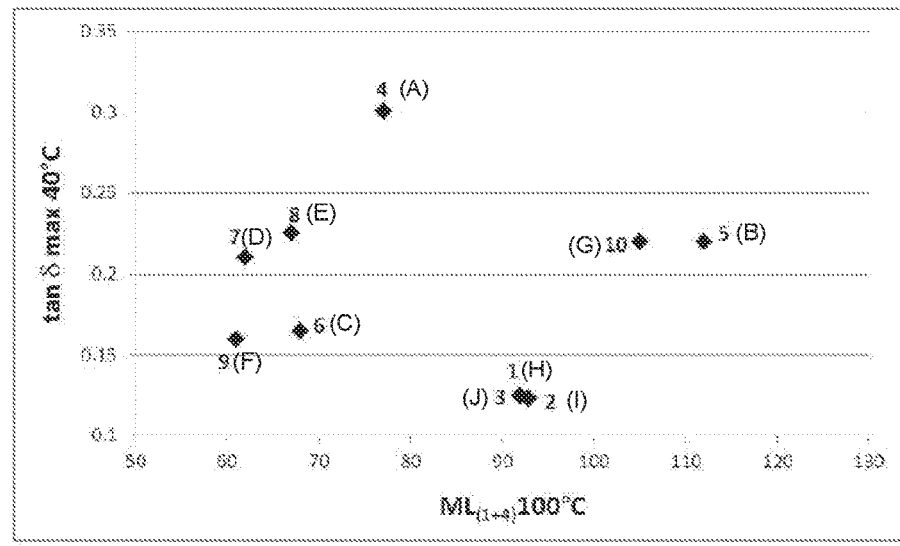
FIGS. 1 and 2 show the dynamic properties and the Mooney viscosity of compositions comprising different diene elastomers.

In the text, the expressions "alkoxysilane bearing a tertiary amine functional group" and "aminoalkoxysilane" have the same meaning and can both be used without distinction.

In the present description, unless expressly indicated otherwise, all the percentages (%) shown are % by weight. Furthermore, any interval of values denoted by the expression "between a and b" represents the range of values extending from more than a to less than b (that is to say, limits a and b excluded), whereas any interval of values denoted by the expression from a to b" means the range of values extending from a up to b (that is to say, including the strict limits a and b).

The term "functionalization of the chain ends to at least 70 mol % by an amine functional group" is understood to mean, according to an embodiment of the invention, a molar degree of functionalization at the chain end of at least 70%, with respect to the number of moles of chain end. In other words, after the polymerization of the monomers, at least 70 mol % of the living chains synthesized bear, at the non-reactive end of the chain, an amine functional group resulting from the polymerization initiator.

This thus means that at least 70 mol % of the chain ends of the modified diene elastomer which is a subject-matter of an embodiment of the invention are functionalized by an amine functional group and that, in particular, at least 70 mol % of the chain ends of the entity functionalized in the middle of the chain by an alkoxysilane group, optionally partially or completely hydrolysed to give a silanol, bearing a tertiary amine functional group and the silicon atom of which bonds the two pieces of the chain, are functionalized by an amine functional group.

It should be specified that it is known to a person skilled in the art that, when an elastomer is modified by reaction of a functionalization agent with the living elastomer resulting from an anionic polymerization stage, a mixture of modified entities of this elastomer is obtained, the composition of which depends in particular on the proportion of reactive sites of the functionalization agent with respect to the number of living chains. This mixture comprises entities functionalized at the chain end, coupled, star-branched and/or non-functionalized.

In the present description, the term "entity coupled" or "elastomer coupled" by an agent bearing a tertiary amine functional group and an alkoxysilane functional group, which can or cannot be hydrolysed to give silanol, is understood to mean the elastomeric entity having the functional group within its elastomer chain, the silicon atom of this group bonding the two pieces of the chain of the diene elastomer. It is then said that the elastomer is coupled or alternatively functionalized in the middle of the chain, in contrast to the position "at the chain end", although the group is not located precisely at the middle of the elastomer chain.

The elastomer according to an embodiment of the invention can also comprise the other entities functionalized or not functionalized by the aminoalkoxysilane group. When the functional group is located at a chain end, it will then be said that the entity is functionalized at the chain end. The silicon atom of this group is directly bonded to the chain of the diene elastomer. When the functional group is central, to which n elastomer chains or branches (n>2) are bonded, forming a star-branched structure of the elastomer, it will then be said that the entity is star-branched. The silicon atom of this group bonds the n branches of the modified diene elastomer to one another.

In the present patent application, "predominantly" or "predominant", in connection with a compound, is understood to mean that this compound is predominant among the compounds of the same type in the composition, that is to say that it is the one which represents the biggest fraction by weight among the compounds of the same type. Thus, for example, a predominant elastomer is the elastomer representing the biggest fraction by weight, with respect to the total weight of the elastomers in the composition. In the same way, a "predominant" filler is that representing the biggest fraction by weight, with respect to the total weight of the combined fillers of the composition. Also, a "predominant" functional entity of a modified diene elastomer is that representing the biggest fraction by weight among the functionalized entities constituting the diene elastomer, with respect to the total weight of the modified diene elastomer. In a system comprising just one compound of a certain type, the latter is predominant within the meaning of the present invention.

The expression "composition based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

As explained above, a subject-matter of an embodiment of the invention is a modified diene elastomer comprising predominantly the entity coupled by an agent bearing a tertiary amine functional group and an alkoxysilane functional group, which can or cannot be hydrolysed to give silanol, the silicon atom bonding the two pieces of the chain and the two chain ends of which are functionalized to at least 70 mol % by an amine functional group.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units.

The following in particular are suitable as conjugated dienes which can be used in the process in accordance with an embodiment of the invention: 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, and the like.

The following in particular are suitable as vinylaromatic compounds: styrene, ortho-, meta- or para-methylstyrene, the "vinyltoluene" commercial mixture, para-(tert-butyl)styrene, methoxystyrenes, vinylmesitylene, divinylbenzene and vinylnaphthalene, and the like.

The diene elastomer of the composition in accordance with an embodiment of the invention is preferably selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The entity functionalized in the middle of the chain by an alkoxysilane group, optionally partially or completely hydrolysed to give silanol, bearing a tertiary amine functional group, the silicon atom of which bonds the two pieces of the chain, the chain ends being functionalized to at least 70 mol % by an amine functional group, preferably corresponds to the following formula (I):

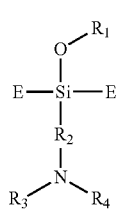

Formula (I)

in which:
the symbol E denotes a diene elastomer functionalized to at least 70 mol % at the chain end by an amine functional group,
$R_1$ denotes, as a function of the degree of hydrolysis, a hydrogen atom or a linear or branched $C_1$-$C_{10}$, preferably $C_1$-$C_8$, alkyl radical, more preferably a $C_1$-$C_4$ alkyl group, more preferably a hydrogen atom or an ethyl or methyl radical;
$R_2$ is a saturated or unsaturated, cyclic or non-cyclic, divalent $C_1$-$C_{18}$ aliphatic hydrocarbon group or $C_6$-$C_{18}$ aromatic hydrocarbon group, preferably a saturated, linear or branched, divalent $C_1$-$C_{10}$, indeed even $C_1$-$C_6$, aliphatic hydrocarbon group, more preferably a saturated linear divalent $C_3$ aliphatic hydrocarbon group;
$R_3$ and $R_4$, which are identical or different, represent a linear or branched $C_1$-$C_{18}$, preferably $C_1$-$C_{10}$ and more preferably $C_1$-$C_4$ alkyl radical, in particular a methyl or ethyl radical, more preferably a methyl radical, or else $R_3$ and $R_4$ form, with N to which they are bonded, a heterocycle comprising a nitrogen atom and at least one carbon atom, preferably from 2 to 6 carbon atoms.

The various aspects, preferred or non-preferred, which precede can be combined with one another.

According to advantageous alternative forms of the invention, at least one of the three following characteristics is observed and preferably the three:

the $R_3$ and $R_4$ groups are identical and are methyl or ethyl groups, preferably methyl groups,
the $R_2$ group is a saturated, linear or branched, divalent $C_1$-$C_6$ aliphatic hydrocarbon group, more preferably still a saturated linear divalent $C_3$ aliphatic hydrocarbon group,
the $R_1$ group is a hydrogen atom or a linear $C_1$-$C_4$ alkyl group, preferably a methyl or ethyl group; more preferably, $R_1$ is a hydrogen atom.

According to a preferred embodiment, the modified diene elastomer according to the invention comprises at least 50% by weight, more preferably at least 70% by weight, with respect to the modified diene elastomer, of entity functionalized in the middle of the chain by the alkoxysilane group, optionally partially or completely hydrolysed to give silanol, bearing a tertiary amine functional group and functionalized to at least 70 mol % at the chain end by an amine functional group.

According to another embodiment, which can be combined with the preceding one, the diene entity functionalized in the middle of the chain by the alkoxysilane group, optionally partially or completely hydrolysed to give silanol, bearing a tertiary amine functional group, is functionalized to 100% at the chain end by an amine functional group.

The modified diene elastomer according to an embodiment of the invention can be prepared according to a process including the modification of the elastomer by reaction of a living diene elastomer with an appropriate functionalization agent, that is to say any at least difunctional molecule, for the purpose of coupling, the functional group being any type of chemical group known by a person skilled in the art to react with a living chain end. Such a process also forms the subject-matter according to an embodiment of the invention.

Thus, according to an embodiment of the invention, the modified diene elastomer is obtained by the use of the following stages:
anionic polymerization of at least one conjugated diene monomer in the presence of a polymerization initiator having an amine functional group,
modification of the living diene elastomer bearing an active site obtained in the preceding stage by a functionalization agent, capable of coupling the elastomer chains, bearing at least one tertiary amine functional group and an alkoxysilane functional group, which can or cannot be hydrolysed to give silanol, with a molar ratio of the functionalization agent to the polymerization initiator with a value ranging from 0.35 to 0.65.

The polymerization initiators comprising an amine functional group result in living chains having an amine group at the non-reactive end of the chain.

Mention may preferably be made, as polymerization initiators comprising an amine functional group, of lithium amides, the products of the reaction of an organolithium compound, preferably an alkyllithium compound, and of a non-cyclic or cyclic, preferably cyclic, secondary amine.

Mention may be made, as secondary amine which can be used to prepare the initiators, of dimethylamine, diethylamine, dipropylamine, di(n-butyl)amine, di(sec-butyl)amine, dipentylamine, dihexylamine, di(n-octyl)amine, di(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole, bistrimethylsilylamine, pyrrolidine and hexamethyleneamine.

The secondary amine, when it is cyclic, is preferably chosen from pyrrolidine and hexamethyleneamine.

The alkyllithium compound is preferably ethyllithium, n-butyllithium (n-BuLi), isobutyllithium, and the like.

Preferably, the polymerization initiator comprising an amine functional group is soluble in a hydrocarbon solvent without use of a solvating agent.

The polymerization initiator comprising an amine functional group is a reaction product of an alkyllithium compound and of a secondary amine. Depending on the molar ratio of the alkyllithium compound to the secondary amine, the product of the reaction can comprise residual alkyllithium compound. Consequently, the polymerization initiator can be composed of a mixture of lithium amide and residual alkyllithium compound. This residual alkyllithium compound results in the formation of living chains not bearing an amine group at the chain end. According to an embodiment of the invention, the polymerization initiator does not comprise more than 30% of alkyllithium compound. Above this value, the desired technical effects, in particular the improvement in the compromise in hysteresis and stiffness properties, are not satisfactory. According to an alternative form of the process, the polymerization initiator does not comprise alkyllithium compound.

The polymerization is preferably carried out in the presence of an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The polymerization can be carried out continuously or batchwise. The polymerization is generally carried out at a temperature of between 20° C. and 150° C. and preferably in the vicinity of 30° C. to 110° C.

The diene elastomer can have any microstructure which depends on the polymerization conditions used. The elastomer can be a block, statistical, sequential, microsequential and the like elastomer and can be prepared in dispersion or in solution. The microstructure of this elastomer can be determined by the presence or absence of a modifying and/or randomizing agent and the amounts of modifying and/or randomizing agent employed.

The second stage of the process according to an embodiment of the invention consists of the modification of the living diene elastomer, obtained on conclusion of the anionic polymerization stage, according to operating conditions which promote the coupling reaction of the diene elastomer with an appropriate functionalization agent. This stage results in the synthesis of a modified diene elastomer predominantly comprising the coupled entity.

The reaction for modification of the living diene elastomer, obtained on conclusion of the first stage, can take place at a temperature of between −20° C. and 100° C., by addition to the living polymer chains or vice versa of a non-polymerizable functionalization agent capable of forming an alkoxysilane group, which can or cannot be hydrolysed to give silanol, bearing a tertiary amine functional group, the silicon atom bonding two pieces of the elastomer chain. This non-polymerizable coupling agent makes it possible in particular to obtain the structures of formula (I) described above. It is in particular a functionalization agent bearing at least one alkoxysilane functional group, which can or cannot be hydrolysed to give silanol, and two functional groups which react with the living elastomer, each of these two functional groups being directly bonded to the silicon atom, and also a tertiary amine functional group.

Thus, according to an alternative form of the process of the invention, the functionalization agent corresponds to the formula:

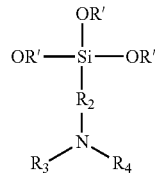

Formula (II)

in which:
R$_2$ is a saturated or unsaturated, cyclic or non-cyclic, divalent C$_1$-C$_{18}$ aliphatic hydrocarbon group or C$_6$-C$_{18}$ aromatic hydrocarbon group, preferably a linear or branched divalent C$_1$-C$_{10}$, preferably C$_1$-C$_6$, aliphatic hydrocarbon radical, better still a saturated linear divalent C$_3$ aliphatic hydrocarbon group;
R$_3$ and R$_4$, which are identical or different, represent a linear or branched C$_1$-C$_{18}$, preferably C$_1$-C$_{10}$ and more preferably C$_1$-C$_4$ alkyl radical, in particular a methyl or ethyl radical, more preferably a methyl radical, or else R$_3$ and R$_4$ form, with N to which they are bonded, a heterocycle comprising a nitrogen atom and at least one carbon atom, preferably from 2 to 6 carbon atoms,
the linear or branched R' radicals, which are identical to or different from one another, represent a C$_1$-C$_{10}$, preferably C$_1$-C$_8$, alkyl group, better still a C$_1$-C$_4$ alkyl group, more preferably a methyl and ethyl group.

Mention may be made, for example, as functionalization agent corresponding to the formula (II), of N,N-dialkylaminopropyltrialkoxysilanes.

Preferably, R$_3$ and R$_4$ present on the nitrogen atom are linear or branched and have from 1 to 10 carbon atoms, more preferably from 1 to 4 carbon atoms, more preferably methyl and ethyl.

The alkoxy substituents formed by the OR' group are preferably hydrolysable.

Preferably, the functionalization agent is chosen from 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane, 3-(N,N-dipropylaminopropyl)trimethoxysilane, 3-(N,N-dipropylaminopropyl)triethoxysilane, 3-(N,N-dibutylaminopropyl)trimethoxysilane, 3-(N,N-dibutylaminopropyl)triethoxysilane, 3-(N,N-dipentylaminopropyl)trimethoxysilane, 3-(N,N-dipentylaminopropyl)triethoxysilane, 3-(N,N-dihexylaminopropyl)trimethoxysilane, 3-(N,N-dihexylaminopropyl)triethoxysilane, 3-(hexamethyleneiminopropyl)trimethoxysilane or 3-(hexamethyleneiminopropyl)triethoxysilane. More preferably still, the functionalization agent is 3-(N,N-dimethylaminopropyl)trimethoxysilane.

The mixing of the living diene polymer and the functionalization agent can be carried out by any appropriate means. The time for reaction between the living diene polymer and the coupling agent can be between 10 seconds and 2 hours.

The molar ratio of the functionalization agent to the initiator of the living polymer chains varies from 0.35 to 0.65, preferably from 0.40 to 0.60 and more preferably still from 0.45 to 0.55.

The process for the synthesis of the modified diene elastomer according to an embodiment of the invention can be continued in a way known per se by the stages of recovery of the modified elastomer.

According to alternative forms of this process, these stages comprise a stripping stage for the purpose of recovering the elastomer resulting from the prior stages in dry form. This stripping stage can in particular have the effect of hydrolysing all or a portion of the hydrolysable alkoxysilane functional groups of the modified diene elastomer in order to convert them into silanol functional groups.

According to other alternative forms of this process, these stages comprise a specific stage of hydrolysis dedicated to the hydrolysis of all or a portion of the hydrolysable alkoxysilane functional groups of the modified diene elastomer in order to convert them into silanol functional groups. This stage of complete or partial hydrolysis can be carried out in a way known per se by addition of an acidic or basic compound. Such hydrolysis stages are described, for example, in the document EP 2 266 819 A 1.

According to yet other alternative forms of the invention, it is also possible to provide an additional star branching of the modified diene elastomer according to an embodiment of the invention. This star branching is advantageously carried out in order to reduce the raw flow of the elastomer matrix. The process for the preparation of the modified diene elastomer according to an embodiment of the invention can then, according to one embodiment, comprise a stage of formation of star-branched entities, generally prior to the modification stage. This star-branching stage can be carried out by reaction with a star-branching agent known per se, for example based on tin or on silicon, or also with the same agent of trialkoxysilane type bearing a tertiary amine functional group with a molar ratio of the functionalization agent to the polymerization initiator with a value of less than or equal to 0.33.

The stages of these different alternative forms can be combined with one another.

Another subject-matter of the invention is a reinforced rubber composition based on at least one reinforcing filler and an elastomer matrix comprising at least one modified diene elastomer as described above. It should be understood that the rubber composition can comprise one or more of these modified diene elastomers according to embodiments of the invention.

The reinforced rubber composition according to an embodiment of the invention can be provided in the cross-linked state or in the non-crosslinked, in other words cross-linkable, state.

The modified diene elastomer according to the invention can, according to different alternative forms, be used alone in the composition or as a blend with at least one other conventional diene elastomer, whether or not star-branched, coupled or functionalized. Preferably, this other diene elastomer used in the invention is selected from the group of highly unsaturated diene elastomers consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs). It is also possible to envisage a blend with any synthetic elastomer other than a diene elastomer, indeed even with any polymer other than an elastomer, for example a thermoplastic polymer.

It should be noted that the improvement in the properties of the composition according to embodiments of the invention will be greater as the proportion of the elastomer(s) different from the modified diene elastomers of the invention in this composition becomes lower.

Thus, preferably, the elastomer matrix predominantly comprises the modified diene elastomer according to an embodiment of the invention.

When the conventional elastomer used in blending is natural rubber and/or one or more diene polymers, such as, for example, polybutadienes, polyisoprenes or butadiene/styrene or butadiene/styrene/isoprene copolymers, this elastomer or these elastomers, modified or unmodified, can then be present at from 1 to 70 parts by weight per 100 parts of modified diene elastomer according to an embodiment of the invention.

More preferably, the elastomer matrix is composed solely of the modified diene elastomer according to an embodiment of the invention.

The rubber composition of embodiments of the invention comprises, besides at least one elastomer matrix as described above, at least one reinforcing filler.

Use may be made of any type of reinforcing filler known for its abilities to reinforce a rubber composition which can be used for the manufacture of tire treads, for example carbon black, a reinforcing inorganic filler, such as silica, with which is combined, in a known way, a coupling agent, or also a mixture of these two types of filler.

All carbon blacks, used individually or in the form of mixtures, in particular blacks of the HAF, ISAF or SAF type, conventionally used in the treads of tires ("tire-grade" blacks), are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks. The carbon blacks might, for example, be already incorporated in the isoprene elastomer in the form of a masterbatch (see, for example, Applications WO 97/36724 or WO 99/16600).

"Reinforcing inorganic filler" should be understood, in the present patent application, by definition, as any inorganic or mineral filler, whatever its colour and its origin (natural or synthetic), capable of reinforcing by itself alone, without means other than an intermediate coupling agent, a rubber composition intended for the manufacture of tires; such a filler is generally characterized, in a known way, by the presence of hydroxyl (—OH) groups at its surface.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$, in particular between 60 and 300 $m^2/g$. Mention will also be made of mineral fillers of the aluminous type, in particular alumina ($Al_2O_3$) or aluminium (oxide) hydroxides, or else reinforcing titanium oxides, for example described in U.S. Pat. No. 6,610,261 and U.S. Pat. No. 6,747,087.

Also suitable as reinforcing fillers are reinforcing fillers of another nature, in particular carbon black, provided that these reinforcing fillers are covered with a siliceous layer or else comprise, at their surface, functional sites, in particular hydroxyl sites, requiring the use of a coupling agent in order to establish the bond between the filler and the elastomer. Mention may be made, by way of example, for example, of carbon blacks for tires, such as described, for example, in patent documents WO 96/37547 and WO 99/28380.

The physical state under which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing fillers, in particular of highly dispersible siliceous fillers as described above.

Preferably, the amount of total reinforcing filler (carbon black and/or other reinforcing filler, such as silica) is between 10 and 200 phr, more preferably between 30 and 150 phr and more preferably still between 70 and 130 phr, the optimum being, in a known way, different according to the specific applications targeted.

According to an alternative form of the invention, the reinforcing filler is predominantly other than carbon black, that is to say that it comprises more than 50% by weight, of the total weight of the filler, of one or more fillers other than carbon black, in particular a reinforcing inorganic filler, such as silica; indeed, it is even exclusively composed of such a filler.

According to this alternative form, when carbon black is also present, it can be used at a content of less than 20 phr, more preferably of less than 10 phr (for example, between 0.5 and 20 phr, in particular from 1 to 10 phr).

According to another alternative form of the invention, use is made of a reinforcing filler predominantly comprising carbon black and optionally silica or another inorganic filler.

When the reinforcing filler comprises a filler requiring the use of a coupling agent in order to establish the bond between the filler and the elastomer, the rubber composition according to an embodiment of the invention in addition conventionally comprises an agent capable of effectively providing this bond. When silica is present in the composition as reinforcing filler, use may be made, as coupling agents, of organosilanes, in particular alkoxysilane polysulphides or mercaptosilanes, or also of at least bifunctional polyorganosiloxanes.

In the composition according to an embodiment the invention, the content of coupling agent is advantageously less than 20 phr, it being understood that it is generally desirable to use as little as possible of it. Its content is preferably between 0.5 and 12 phr. The presence of the coupling agent depends on the presence of the reinforcing inorganic filler. Its content is easily adjusted by a person skilled in the art according to the content of this filler; it is typically of the order of 0.5% to 15% by weight, with respect to the amount of reinforcing inorganic filler other than carbon black.

The rubber composition according to an embodiment of the invention can also comprise, in addition to the coupling agents, coupling activators, agents for covering the fillers or more generally processing aids capable, in a known way, by virtue of an improvement in the dispersion of the filler in the rubber matrix and of a lowering of the viscosity of the composition, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with embodiments of the invention can also comprise reinforcing organic fillers which can replace all or a portion of the carbon blacks or of the other reinforcing inorganic fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

The rubber composition according to an embodiment of the invention can also comprise all or a portion of the usual additives generally used in elastomer compositions intended for the manufacture of tires, such as, for example, pigments, non-reinforcing fillers, protective agents, such as antiozone waxes, chemical antiozonants or antioxidants, antifatigue agents, plasticizing agents, reinforcing or plasticizing resins, methylene acceptors (for example, phenolic novolak resin) or methylene donors (for example, HMT or H3M), such as described, for example, in Application WO 02/10269, a crosslinking system based either on sulphur or on sulphur donors and/or on peroxide and/or on bismaleimides, vulcanization accelerators or vulcanization activators.

The composition is manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for the preparation of a composition according to an embodiment of the invention generally comprises:

(i) the implementation, at a maximum temperature of between 130° C. and 200° C., of a first step of thermomechanical working of the constituents of the composition comprising the modified diene elastomer according to an embodiment of the invention and a reinforcing filler, with the exception of a crosslinking system, then (ii) the implementation, at a temperature lower than said maximum temperature of said first step, of a second step of mechanical working during which said crosslinking system is incorporated.

This process can also comprise, prior to the implementation of the abovementioned stages (i) and (ii), the stages of the preparation of the diene elastomer predominantly coupled by an alkoxysilane group bearing a tertiary amine functional group and bonded to the diene elastomer via the silicon atom according to the process described above.

Another subject-matter of the invention is a semi-finished article made of rubber for a tire, comprising a rubber composition according to an embodiment of the invention which is crosslinkable or crosslinked or composed of such a composition.

The final composition thus obtained can subsequently be calendered, for example in the form of a sheet or a plaque or also extruded, for example in order to form a rubber profiled element which can be used as a semi-finished rubber product intended for the tire. Such a semi-finished product also forms the subject-matter of an embodiment of the invention.

Due to the improvement in the hysteresis/raw processing/stiffness compromise which characterizes a reinforced rubber composition according to an embodiment of the invention, it should be noted that such a composition can constitute any semi-finished product of the tire and very particularly the tread, reducing in particular its rolling resistance and improving the wear resistance.

A final subject-matter of an embodiment of the invention is thus a tire comprising a semi-finished article according to the invention, in particular a tread.

The abovementioned characteristics of the embodiments of the present invention, and also others, will be better understood on reading the following description of several implementational example embodiments of the invention, given by way of illustration and without limitation.

EXAMPLES

Examples of the Preparation of Modified Elastomers

Preparation of the Polymer A: SBR Non-Functional—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 535 ml of 0.05 mol·l$^{-1}$ n-butyllithium in methylcyclohexane are added. The polymerization is carried out at 50° C.

After 40 minutes, the degree of conversion of the monomers reaches 90%. This content is determined by weighing an extract dried at 140° C. under a reduced pressure of 200 mmHg. 530 ml of a 0.15 mol·l$^{-1}$ solution of methanol in toluene are then added. The solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The Mooney viscosity of the polymer is 60.

The number-average molar mass $M_n$ of this copolymer, determined by the SEC technique, is 192 000 g·mol$^{-1}$ and the polydispersity index PI is 1.07.

The microstructure of this copolymer is determined by the NIR method. The content of 1,2-units is 59%, with respect to the butadiene units. The content by weight of styrene is 25%.

The glass transition temperature of this copolymer is −24° C.

Preparation of the Polymer B: SBR Amine-Functional at the Chain End—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l$^{-1}$ lithium hexamethyleneamine in methylcyclohexane are added. The polymerization is carried out at 50° C.

After 32 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·l$^{-1}$ in toluene at 25° C., is 1.10 dl·g$^{-1}$. 268 ml of a 0.1 mol·l$^{-1}$ solution of dimethyldichlorosilane in methylcyclohexane are added. After reacting at 50° C. for 20 minutes, the solution is antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.80 dl·g$^{-1}$. The jump in viscosity, defined as the ratio of said "final" viscosity to said "initial" viscosity, is in this instance 1.63. The Mooney viscosity of the polymer thus coupled is 59.

The number-average molar mass $M_n$ of this copolymer, determined by the SEC technique, is 188 000 g·mol$^{-1}$ and the polydispersity index PI is 1.09.

The microstructure of this copolymer is determined by the NIR method. The content of 1,2-units is 60%, with respect to the butadiene units. The content by weight of styrene is 25%.

The glass transition temperature of this copolymer is −24° C.

Preparation of the Polymer C: SBR Aminoalkoxysilane-Functional in the Middle of the Chain—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l$^{-1}$ n-butyllithium in methylcyclohexane are added. The polymerization is carried out at 50° C.

After 30 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·dl$^{-1}$ in toluene at 25° C., is 1.11 dl·g$^{-1}$. 268 ml of a 0.1 mol·l$^{-1}$ solution of 3-(N,N-dimethylaminopropyl)trimethoxysilane in methylcyclohexane are added. After reacting at 50° C. for 20 minutes, the solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.78 dl·g$^{-1}$. The jump in viscosity, defined as the ratio of said "final" viscosity to said "initial" viscosity, is in this instance 1.60. The Mooney viscosity of the polymer thus coupled is 59.

The number-average molar mass $M_n$ of this copolymer, determined by the SEC technique, is 187 000 g·mol$^{-1}$ and the polydispersity index PI is 1.13.

The percentage by weight of coupled entities, determined by the high resolution SEC technique, is 85%.

The microstructure of this copolymer is determined by the NIR method. The content of 1,2-units is 60%, with respect to the butadiene units. The content by weight of styrene is 25%.

The glass transition temperature of this copolymer is −24° C.

The content of residual SiOCH$_3$ functional group after stripping/drying, determined by $^1$H NMR, is 65%.

Preparation of the Polymer D: SBR Silanol-Functional in the Middle of the Chain—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l$^{-1}$ n-butyllithium in methylcyclohexane are added. The polymerization is carried out at 50° C.

After 30 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·l$^{-1}$ in toluene at 25° C., is 1.10 dl·g$^{-1}$. 268 ml of a 0.1 mol·l$^{-1}$ solution of methyltrichlorosilane in methylcyclohexane are added. After reacting at 0° C. for 20 minutes, an excess of water is added in order to hydrolyse the SiCl functional groups present on the polymer chains. The solution is subsequently antioxidized by addition of 0.8 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.80 dl·g$^{-1}$. The jump in viscosity, defined as the ratio of said "final" viscosity to said "initial" viscosity, is in this instance 1.64. The Mooney viscosity of the polymer thus coupled is 60.

The number-average molar mass $M_n$ of this copolymer, determined by the SEC technique, is 190 000 g·mol$^{-1}$ and the polydispersity index PI is 1.10.

The percentage by weight of coupled entities, determined by the high resolution SEC technique, is 82%.

The microstructure of this copolymer is determined by the NIR method. The content of 1,2-units is 60%, with respect to the butadiene units. The content by weight of styrene is 25%.

The glass transition temperature of this copolymer is −24° C.

Preparation of the Polymer E: SBR Epoxide+Alkoxysilane-Functional in the Middle of the Chain—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l$^{-1}$ n-butyllithium in methylcyclohexane are added. The polymerization is carried out at 50° C.

After 30 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·dl$^{-1}$ in toluene at 25° C., is 1.10 dl·g$^{-1}$. 268 ml of a 0.1 mol·l$^{-1}$ solution of 3-(glycidyloxypropyl)trimethoxysilane in methylcyclohexane are added. After reacting at 50° C. for 20 minutes, the solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.77 dl·g$^{-1}$. The jump in viscosity, defined as the ratio of said "final" viscosity to said "initial" viscosity, is in this instance 1.61. The Mooney viscosity of the polymer thus coupled is 58.

The number-average molar mass $M_n$ of this copolymer, determined by the SEC technique, is 186 000 g·mol$^{-1}$ and the polydispersity index PI is 1.14.

The percentage by weight of coupled entities, determined by the high resolution SEC technique, is 86%.

The microstructure of this copolymer is determined by the NIR method. The content of 1,2-units is 60%, with respect to the butadiene units. The content by weight of styrene is 25%.

The glass transition temperature of this copolymer is −24° C.

Preparation of the Polymer F: SBR Silanol+Polyether-Functional in the Middle of the Chain—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l$^{-1}$ n-butyllithium in methylcyclohexane are added. The polymerization is carried out at 50° C.

After 30 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·dl$^{-1}$ in toluene at 25° C., is 1.10 dl·g$^{-1}$. 268 ml of a 0.1 mol·l$^{-1}$ solution of poly(oxy-1,2-ethanediyl), α-[3-(dichloromethylsilyl)propyl]-ω-[3-(dichloromethylsilyl)propoxy], in diethyl ether are added. After reacting at 50° C. for 90 minutes, an excess of water is added in order to neutralize the SiCl functional groups present on the polymer chains. The solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.76 dl·g$^{-1}$. The jump in viscosity, defined as the ratio of said "final" viscosity to said "initial" viscosity, is in this instance 1.60. The Mooney viscosity of the polymer thus coupled is 59.

The number-average molar mass $M_n$ of this copolymer, determined by the SEC technique, is 186 000 g·mol$^{-1}$ and the polydispersity index PI is 1.15.

The microstructure of this copolymer is determined by the NIR method. The content of 1,2-units is 60%, with respect to the butadiene units. The content by weight of styrene is 25%.

The glass transition temperature of this copolymer is −24° C.

Preparation of the Polymer G: SBR Silanol-Functional at the Chain End—Control 1.8 kg of styrene and 4.9 kg of butadiene, and also 395 ml of a 0.1 mol·l$^{-1}$ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 535 ml of 0.05 mol·l⁻¹ n-butyllithium in methylcyclohexane are added. The polymerization is carried out at 50° C.

After 40 minutes, the degree of conversion of the monomers reaches 90%. This content is determined by weighing an extract dried at 140° C. under a reduced pressure of 200 mmHg. 134 ml of a 0.1 mol·l⁻¹ solution of hexamethylcyclotrisiloxane in methylcyclohexane are then added. After 30 minutes at 60° C., 535 ml of a 0.15 mol·l⁻¹ solution of methanol in toluene are then added. The solution is subsequently antioxidized by addition of 0.8 part per hundred parts of elastomer (phr) of 4,4'-methylenebis(2,6-(tert-butyl) phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The Mooney viscosity of the polymer is 59.

The number-average molar mass $M_n$ of this copolymer, determined by the SEC technique, is 190 000 g·mol⁻¹ and the polydispersity index PI is 1.05.

The microstructure of this copolymer is determined by the NIR method. The content of 1,2-units is 59%, with respect to the butadiene units. The content by weight of styrene is 25%.

The glass transition temperature of this copolymer is −24° C.

Preparation of the Polymer H: SBR Amine-Functional at the Chain End and Aminoalkoxysilane-Functional in the Middle of the Chain (Functionalization Agent: Dimethylaminopropyltrimethoxysilane) According to an Embodiment of the Invention 1.8 kg of styrene and 4.9 kg of butadiene, and also 395 ml of a 0.1 mol·l⁻¹ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l⁻¹ lithium hexamethyleneamine in methylcyclohexane are added. The polymerization is carried out at 50° C.

After 32 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·dl⁻¹ in toluene at 25° C., is 1.10 dl·g⁻¹. 268 ml of a 0.1 mol·l⁻¹ solution of 3-(N,N-dimethylaminopropyl)trimethoxysilane in methylcyclohexane are added. After reacting at 50° C. for 20 minutes, the solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.79 dl·g⁻¹. The jump in viscosity, defined as the ratio of said "final" viscosity to said "initial" viscosity, is in this instance 1.63. The Mooney viscosity of the polymer thus coupled is 59.

The number-average molar mass $M_n$ of this copolymer, determined by the SEC technique, is 189 000 g·mol⁻¹ and the polydispersity index PI is 1.13.

The percentage by weight of coupled entities, determined by the high resolution SEC technique, is 79%.

The microstructure of this copolymer is determined by the NIR method. The content of 1,2-units is 60%, with respect to the butadiene units. The content by weight of styrene is 25%.

The glass transition temperature of this copolymer is −24° C.

The content of residual $SiOCH_3$ functional group after stripping/drying, determined by ¹H NMR, is 45%.

Preparation of the Polymer I: SBR Amine-Functional at the Chain End and Aminoalkoxysilane-Functional in the Middle of the Chain (Functionalization Agent: Diethylaminopropyltrimethoxysilane) According to an Embodiment of the Invention 1.8 kg of styrene and 4.9 kg of butadiene, and also 395 ml of a 0.1 mol·l⁻¹ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l⁻¹ lithium hexamethyleneamine in methylcyclohexane are added. The polymerization is carried out at 50° C.

After 32 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·dl⁻¹ in toluene at 25° C., is 1.12 dl·g⁻¹. 268 ml of a 0.1 mol·l⁻¹ solution of 3-(N,N-diethylaminopropyl)trimethoxysilane in methylcyclohexane are added. After reacting at 50° C. for 20 minutes, the solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.80 dl·g⁻¹. The jump in viscosity, defined as the ratio of said "final" viscosity to said "initial" viscosity, is in this instance 1.61. The Mooney viscosity of the polymer thus coupled is 61.

The number-average molar mass $M_n$ of this copolymer, determined by the SEC technique, is 192 000 g·mol⁻¹ and the polydispersity index PI is 1.14.

The percentage by weight of coupled entities, determined by the high resolution SEC technique, is 81%.

The microstructure of this copolymer is determined by the NIR method. The content of 1,2-units is 60%, with respect to the butadiene units. The content by weight of styrene is 25%.

The glass transition temperature of this copolymer is −24° C.

The content of residual $SiOCH_3$ functional group after stripping/drying, determined by ¹H NMR, is 65%.

Preparation of the Polymer J: SBR Amine-Functional at the Chain End and Aminoalkoxysilane-Functional in the Middle of the Chain (Functionalization Agent: Dimethylaminopropyltrimethoxysilane), Hydrolysed, According to an Embodiment of the Invention 1.8 kg of styrene and 4.9 kg of butadiene, and also 395 ml of a 0.1 mol·l⁻¹ solution of tetrahydrofurfuryl ether in methylcyclohexane, are injected into a 90-liter reactor, maintained under a nitrogen pressure of approximately 2 bar, containing 44.7 kg of methylcyclohexane. After neutralization of the impurities in the solution to be polymerized by addition of n-butyllithium, 1.07 l of 0.05 mol·l⁻¹ lithium hexamethyleneamine in methylcyclohexane are added. The polymerization is carried out at 50° C.

After 32 minutes, the degree of conversion of the monomers reaches 90%. This content is determined by weighing an extract dried at 140° C. under a reduced pressure of 200 mmHg. A control sample is then withdrawn from the reactor and then stopped with an excess of methanol with respect to the lithium. The intrinsic viscosity ("initial" viscosity), which is measured at 0.1 g·dl⁻¹ in toluene at 25° C., is 1.10 dl·g⁻¹. 268 ml of a 0.1 mol·l⁻¹ solution of 3-(N,N-dimethylaminopropyl)trimethoxysilane in methylcyclohexane are added. After reacting at 50° C. for 20 minutes, a 0.1 mol·l⁻¹ aqueous hydrochloric acid solution (2 mol. Eq. of HCl with respect to the lithium) is added and the solution is stirred for 30 minutes. The solution is subsequently antioxidized by addition of 0.8 part per hundred parts of elastomer (phr) of 4,4'-methylenebis(2,6-(tert-butyl)phenol) and 0.2 part per hundred parts of elastomer (phr) of N-(1,3-dimethylbutyl)-N'-phenyl-p-phenylenediamine. The copolymer thus treated is separated from its solution by a steam stripping operation and then dried on open mills at 100° C. for 15 minutes.

The "final" intrinsic viscosity measured is 1.79 dl·g⁻¹. The jump in viscosity, defined as the ratio of said "final" viscosity to said "initial" viscosity, is in this instance 1.63. The Mooney viscosity of the polymer thus coupled is 61.

The number-average molar mass $M_n$ of this copolymer, determined by the SEC technique, is 190 000 g·mol⁻¹ and the polydispersity index PI is 1.15.

The percentage by weight of coupled entities, determined by the high resolution SEC technique, is 81%.

The microstructure of this copolymer is determined by the NIR method. The content of 1,2-units is 60%, with respect to the butadiene units. The content by weight of styrene is 25%.

The glass transition temperature of this copolymer is −24° C.

The content of residual $SiOCH_3$ functional group after hydrolysis/stripping/drying, determined by ¹H NMR, is zero.

Comparative Examples of Rubber Compositions

Measurements and Tests Used
Size Exclusion Chromatography

The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

There is no specific treatment of the polymer sample before analysis. The latter is simply dissolved in the elution solvent at a concentration of approximately 1 g·l⁻¹. The solution is then filtered through a filter with a porosity of 0.45 μm before injection.

The apparatus used is a "Waters Alliance" chromatographic line. The elution solvent is either tetrahydrofuran or tetrahydrofuran+1 vol % of diisopropylamine+1 vol % of triethylamine, the flow rate is 1 ml·min⁻¹, the temperature of the system is 35° C. and the analytical time is 30 min. A set of two Waters columns with the "Styragel HT6E" trade name is used. The volume of the solution of the polymer sample injected is 100 The detector is a "Waters 2410" differential refractometer and the software for making use of the chromatographic data is the "Waters Empower" system.

The calculated average molar masses are relative to a calibration curve produced for SBRs having the following microstructure: 25% by weight of units of styrene type, 23% by weight of units of 1,2-type and 50% by weight of units of trans-1,4-type.

High-Resolution Size Exclusion Chromatography

The high-resolution SEC technique is used to determine the percentages by weight of the various populations of chains present in a polymer sample.

There is no specific treatment of the polymer sample before analysis. The latter is simply dissolved in the elution solvent at a concentration of approximately 1 g·l⁻¹. The solution is then filtered through a filter with a porosity of 0.45 μm before injection.

The apparatus used is a "Waters Alliance 2695" chromatographic line. The elution solvent is tetrahydrofuran, the flow rate is 0.2 ml·min⁻¹ and the temperature of the system is 35° C. A set of three identical columns in series is used (Shodex, length 300 mm, diameter 8 mm). The number of theoretical plates of the set of columns is greater than 22 000. The volume of the solution of the polymer sample injected is 50 μl. The detector is a "Waters 2414" differential refractometer and the software for making use of the chromatographic data is the "Waters Empower" system.

The calculated molar masses are relative to a calibration curve produced for SBRs having the following microstructure: 25% by weight of units of styrene type, 23% by weight of units of 1,2-type and 50% by weight of units of trans-1,4-type.

Mooney Viscosity

For the polymers and rubber compositions, the Mooney viscosities $ML_{(1+4)}$ 100° C. are measured according to Standard ASTM D-1646.

Use is made of an oscillating consistometer as described in Standard ASTM D-1646. The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement after rotating for 4 minutes is measured. The Mooney plasticity $ML_{(1+4)}$ is expressed in "Mooney unit" (MU, with 1 MU=0.83 N·m).

Differential Calorimetry

The glass transition temperatures (Tg) of the elastomers are determined using a differential scanning calorimeter.

Near-Infrared (NIR) Spectroscopy

The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by ¹³C NMR. The styrene content and the microstructure are then calculated from the NIR spectrum of an elastomer film having a thickness of approximately 730 μm. The spectrum is acquired in transmission mode between 4000 and 6200 cm⁻¹ with a resolution of 2 cm⁻¹ using a Bruker Tensor 37 Fourier-transform near-infrared spectrometer equipped with an InGaAs detector cooled by the Peltier effect.

Proton Nuclear Magnetic Resonance ($^1$H NMR)

The content of SiOCH$_3$ functional group is determined by $^1$H NMR. The NMR analyses are carried out on a Bruker 500 MHz spectrometer equipped with a 5 mm BBIz "broad band" probe. For the quantitative $^1$H NMR experiment, the sequence uses a 30° pulse and a repetition time of 2 seconds. The samples are dissolved in carbon disulphide (CS$_2$). 100 µl of deuterated cyclohexane (C$_6$D$_{12}$) are added for the lock signal.

Intrinsic Viscosity

The intrinsic viscosity of the elastomers at 25° C. is determined from a 0.1 g·dl$^{-1}$ solution of elastomer in toluene, according to the following principle:

The intrinsic viscosity is determined by the measurement of the flow time t of the polymer solution and of the flow time t$_o$ of the toluene in a capillary tube.

The flow time of the toluene and the flow time of the 0.1 g·dl$^{-1}$ polymer solution are measured in an Ubbelohde tube (diameter of the capillary 0.46 mm, capacity from 18 to 22 ml) placed in a bath thermostatically controlled at 25±0.1° C.

The intrinsic viscosity is obtained by the following relationship:

$$\eta_{inh} = \frac{1}{C} \ln\left[\frac{(t)}{(t_o)}\right]$$

with:

C: concentration of the solution of polymer in toluene in g·dl$^{-1}$, t: flow time of the solution of polymer in toluene in seconds, t$_o$: flow time of the toluene in seconds, $\eta_{inh}$: intrinsic viscosity, expressed in dl·g$^{-1}$.

Dynamic Properties

The dynamic properties G* and tan(δ) max are measured on a viscosity analyser (Metravib VA4000) according to Standard ASTM D 5992-96. The response of a sample of vulcanized composition (cylindrical test specimen with a thickness of 2 mm and a cross-section of 79 mm$^2$), subjected to a simple alternating sinusoidal shear stress, at a frequency of 10 Hz, under standard temperature conditions (40° C.) according to Standard ASTM D 1349-99, is recorded. A strain amplitude sweep is carried out from 0.1% to 50% peak-to-peak (outward cycle) and then from 50% to 0.1% peak-to-peak (return cycle). The results made use of are the complex dynamic shear modulus (G*) and the loss factor tan(δ). For the return cycle, the maximum value of tan(δ) observed, denoted tan(δ) max, is indicated. This value is representative of the hysteresis of the material and in the present case of the rolling resistance: the smaller the value of tan(δ) max, the lower the rolling resistance. The G* values, measured at 40° C., are representative of the stiffness, that is to say of the resistance to deformation: the higher the value of G*, the greater the stiffness of the material and thus the higher the wear resistance.

The Compositions

Ten compositions given in Table 1 below are compared. Seven of them (compositions 4 to 10) are not in accordance with regard to the composition recommended by an embodiment of the invention. The formulations are expressed in percentage by weight per 100 parts by weight of elastomer (phr).

TABLE 1

|  | Examples ||| Comparative examples |||||||
|---|---|---|---|---|---|---|---|---|---|---|
|  | 1 | 2 | 3 | 4 | 5 | 6 | 7 | 8 | 9 | 10 |
| Polymer A |  |  |  | 100 |  |  |  |  |  |  |
| Polymer B |  |  |  |  | 100 |  |  |  |  |  |
| Polymer C |  |  |  |  |  | 100 |  |  |  |  |
| Polymer D |  |  |  |  |  |  | 100 |  |  |  |
| Polymer E |  |  |  |  |  |  |  | 100 |  |  |
| Polymer F |  |  |  |  |  |  |  |  | 100 |  |
| Polymer G |  |  |  |  |  |  |  |  |  | 100 |
| Polymer H | 100 |  |  |  |  |  |  |  |  |  |
| Polymer I |  | 100 |  |  |  |  |  |  |  |  |
| Polymer J |  |  | 100 |  |  |  |  |  |  |  |
| Silica (1) | 80 | 80 | 80 | 80 | 80 | 80 | 80 | 80 | 80 | 80 |
| N234 | 1 | 1 | 1 | 1 | 1 | 1 | 1 | 1 | 1 | 1 |
| MES Oil (2) | 15 | 15 | 15 | 15 | 15 | 15 | 15 | 15 | 15 | 15 |
| Resin (3) | 15 | 15 | 15 | 15 | 15 | 15 | 15 | 15 | 15 | 15 |
| Coupling agent (4) | 6.4 | 6.4 | 6.4 | 6.4 | 6.4 | 6.4 | 6.4 | 6.4 | 6.4 | 6.4 |
| ZnO | 2.5 | 2.5 | 2.5 | 2.5 | 2.5 | 2.5 | 2.5 | 2.5 | 2.5 | 2.5 |
| Stearic acid | 2 | 2 | 2 | 2 | 2 | 2 | 2 | 2 | 2 | 2 |
| Antioxidant (5) | 1.9 | 1.9 | 1.9 | 1.9 | 1.9 | 1.9 | 1.9 | 1.9 | 1.9 | 1.9 |
| Antiozone wax C32ST (6) | 1.5 | 1.5 | 1.5 | 1.5 | 1.5 | 1.5 | 1.5 | 1.5 | 1.5 | 1.5 |
| Diphenylguanidine | 1.5 | 1.5 | 1.5 | 1.5 | 1.5 | 1.5 | 1.5 | 1.5 | 1.5 | 1.5 |
| Sulphur | 1.2 | 1.2 | 1.2 | 1.2 | 1.2 | 1.2 | 1.2 | 1.2 | 1.2 | 1.2 |
| Sulphenamide (7) | 2 | 2 | 2 | 2 | 2 | 2 | 2 | 2 | 2 | 2 |

(1) Silica Zeosil 1165MP from Rhodia.
(2) Catenex ® SBR from Shell.
(3) Polylimonene.
(4) "Si69" from Degussa.
(5) N-(1,3-Dimethylbutyl)-N'-phenyl-p-phenylenediamine.
(6) Antiozone from Repsol.
(7) N-Cyclohexyl-2-benzothiazolesulphenamide.

The following procedure is used for the tests which follow:

Each of the compositions is produced, in a first step, by thermomechanical working and then, in a second finishing step, by mechanical working.

The elastomer, two-thirds of the silica, the coupling agent, the diphenylguanidine and the carbon black are introduced into a laboratory internal mixer of "Banbury" type which has a capacity of 400 cm$^3$, which is 72% filled and which has an initial temperature of 90° C.

The thermomechanical working is carried out by means of blades, the mean speed of which is 50 rev/min and the temperature of which is 90° C.

After one minute, the final one-third of the silica, the antioxidant, the stearic acid, the antiozone wax, the MES oil and the resin are introduced, still under thermomechanical working.

After two minutes, the zinc oxide is introduced, the speed of the blades being 50 rev/min.

The thermomechanical working is carried out for a further two minutes, up to a maximum dropping temperature of approximately 160° C.

The mixture thus obtained is recovered and cooled and then, in an external mixer (homofinisher), the sulphur and the sulphenamide are added at 30° C., the combined mixture being further mixed for a time of 3 to 4 minutes (second step of mechanical working).

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads.

Crosslinking is carried out at 150° C. for 40 min.

Figure 2:
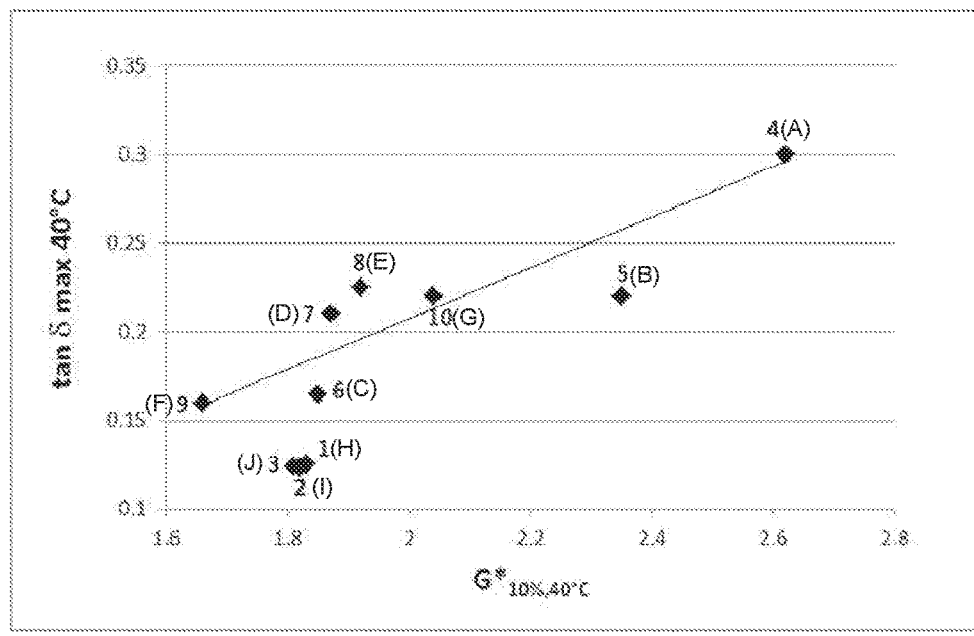

The results are presented in Table 2 and in FIGS. 1 and 2.

TABLE 2

| Rubber results(tan(δ)max 40° C., G*$_{10\%,40° C.}$, ML$_{(1+4)}$100° C.): | | | | | | | | | | |
|---|---|---|---|---|---|---|---|---|---|---|
| | Examples | | | Comparative examples | | | | | | |
| | 1 | 2 | 3 | 4 | 5 | 6 | 7 | 8 | 9 | 10 |
| Tan(δ)$_{max}$ 40° C. | 0.125 | 0.123 | 0.124 | 0.30 | 0.22 | 0.165 | 0.21 | 0.225 | 0.16 | 0.22 |
| G*$_{10\%,40° C.}$ | 1.83 | 1.82 | 1.81 | 2.62 | 2.35 | 1.85 | 1.87 | 1.92 | 1.66 | 2.04 |
| ML$_{(1+4)}$100° C. | 92 | 93 | 92 | 77 | 112 | 68 | 62 | 67 | 61 | 105 |

FIG. 1 shows that compositions 1, 2 and 3, comprising an SBR which is amine-functional at the chain end and aminoalkoxysilane-functional in the middle of the chain (respectively dimethylaminopropyltrimethoxysilane (polymer H), diethylaminopropyltrimethoxysilane (polymer I) and hydrolysed dimethylaminopropyltrimethoxysilane (polymer J)), exhibit a lower tan(δ) max 40° C. value than composition 4 comprising control polymer A (non-functional), than composition 5 comprising control polymer B (amine-functional at the chain end) and than compositions 6, 7, 8, 9 and 10 respectively comprising control polymer C (aminoalkoxysilane-functional in the middle of the chain (dimethylaminopropyltrimethoxysilane)), polymer D (silanol-functional in the middle of the chain), polymer E (epoxide+alkoxysilane-functional in the middle of the chain), polymer F (silanol+polyether-functional in the middle of the chain) and polymer G (silanol-functional at the chain end). This reflects an improved hysteresis.

The processing of compositions 1, 2 and 3 nevertheless remains entirely acceptable, in particular in the light of composition A, which comprises a non-functional elastomer generally used in the formulations for semi-finished products intended for the preparation of tires.

FIG. 2 shows that compositions 1, 2 and 3 exhibit a tan(δ) max 40° C./G*$_{10\%, 40° C.}$ compromise which is offset with respect to the other compositions and in particular with respect to composition 6 comprising the control polymer C (aminoalkoxysilane-functional in the middle of the chain). This reflects an improved stiffness/hysteresis compromise for compositions 1, 2 and 3 comprising the modified polymers according to embodiments of the invention.

The invention claimed is:

1. A modified diene elastomer comprising at least 50% by weight, with respect to the modified diene elastomer, of an entity functionalized in the middle of the chain by an alkoxysilane group, bearing a tertiary amine functional group and the silicon atom of which bonds the two pieces of the chain, the chain ends of the modified diene elastomer being functionalized to at least 70 mol %, with respect to the number of moles of chain end, by an amine functional group.

2. A modified diene elastomer according to claim 1, wherein the entity functionalized in the middle of the chain by the alkoxysilane group, bearing a tertiary amine functional group, the silicon atom of which bonds the two pieces of the chain, the chain ends being functionalized to at least 70 mol % by an amine functional group, corresponds to the following formula (I):

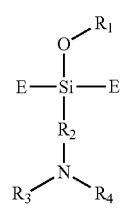

Formula (I)

in which:
the symbol E denotes a diene elastomer functionalized to at least 70 mol % at the chain end by an amine functional group,
$R_1$ denotes, as a function of the degree of hydrolysis, a hydrogen atom or a linear or branched $C_1$-$C_{10}$ alkyl radical, $R_2$ is a saturated or unsaturated, cyclic or non-cyclic, divalent $C_1$-$C_{18}$ aliphatic hydrocarbon group or $C_6$-$C_{18}$ aromatic hydrocarbon group, $R_3$ and $R_4$, which are identical or different, represent a linear or branched $C_1$-$C_{18}$ alkyl radical, or else $R_3$ and $R_4$ form, with N to which they are bonded, a heterocycle comprising a nitrogen atom and at least one carbon atom.

3. A modified diene elastomer according to claim 2, wherein $R_1$ represents a hydrogen atom or a methyl or ethyl radical.

4. A modified diene elastomer according to claim 2, wherein $R_1$ represents a hydrogen atom.

5. A modified diene elastomer according to claim 2, wherein $R_2$ represents the saturated linear divalent $C_3$ aliphatic hydrocarbon radical.

6. A modified diene elastomer according to claim 2, wherein $R_3$ and $R_4$, which are identical or different, represent a methyl or ethyl radical.

7. A modified diene elastomer according to claim 1, wherein the modified diene elastomer is a copolymer of butadiene and of a vinylaromatic monomer.

8. A modified diene elastomer according to claim 1, comprising at least 70% by weight, with respect to the modified diene elastomer, of the entity functionalized in the middle of the chain by the alkoxysilane group, bearing a tertiary amine functional group, the silicon atom of which bonds the two pieces of the chain, the chain ends being functionalized to at least 70 mol % by an amine functional group.

9. A process for the preparation of a modified diene elastomer as defined in claim 1, comprising:
   anionic polymerization of at least one conjugated diene monomer in the presence of a polymerization initiator having an amine functional group,
   modification of the living diene elastomer bearing an active site obtained in the preceding stage by a functionalization agent, capable of coupling the elastomer chains, bearing at least one tertiary amine functional group and an alkoxysilane functional group, which can be hydrolysed to give silanol, with a molar ratio of the functionalization agent to the polymerization initiator with a value ranging from 0.35 to 0.65.

10. A preparation process according to claim 9, wherein the polymerization initiator comprises an amine functional group chosen from lithium amides obtained from a secondary amine, and from an organolithium compound.

11. A preparation process according to claim 9, wherein the functionalization agent corresponds to the formula:

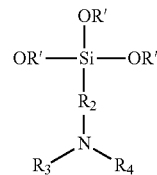

Formula (II)

in which:
   $R_2$ is a saturated or unsaturated, cyclic or non-cyclic, divalent $C_1$-$C_{18}$ aliphatic hydrocarbon group or $C_6$-$C_{18}$ aromatic hydrocarbon group,
   $R_3$ and $R_4$, which are identical or different, represent a linear or branched $C_1$-$C_{18}$ alkyl radical, or else $R_3$ and $R_4$ form, with N to which they are bonded, a heterocycle comprising a nitrogen atom and at least one carbon atom,
   the linear or branched R' radicals, which are identical to or different from one another, represent a $C_1$-$C_{10}$ alkyl group.

12. A reinforced rubber composition based on at least one reinforcing filler and an elastomer matrix comprising at least one modified diene elastomer as defined in claim 1.

13. A rubber composition according to claim 12, wherein the elastomer matrix predominantly comprises the modified diene elastomer as defined in claim 1.

14. A rubber composition according to claim 12, wherein said reinforcing filler comprises a reinforcing inorganic filler of siliceous type according to a fraction by weight of greater than 50% and ranging up to 100%.

15. A semi-finished article made of rubber for a tire, comprising a crosslinkable or crosslinked rubber composition according to claim 12.

16. A tire comprising a semi-finished article as defined in claim 15.

17. A modified diene elastomer according to claim 6, wherein $R_3$ and $R_4$ are identical and represent a methyl radical.

18. A modified diene elastomer according to claim 7, wherein the modified diene elastomer is an SBR.

19. A preparation process according to claim 10, wherein the secondary amine is a cyclic secondary amine.

20. A preparation process according to claim 11, wherein $R_3$ and $R_4$ represent a $C_1$-$C_4$ alkyl radical, and the linear or branched R' radicals represent a $C_1$-$C_4$ alkyl group.

21. A modified diene elastomer according to claim 1, wherein the alkoxysilane group is partially or completely hydrolysed to give silanol.

* * * * *